Patented July 8, 1952

2,602,818

UNITED STATES PATENT OFFICE 2,602,818

PROCESS FOR THE PURIFICATION OF EPINEPHRINE

Frank H. Tendick, Grosse Pointe Park, Mich., assignor to Parke, Davis & Company, Detroit, Mich., a corporation of Michigan No Drawing. Application July 25, 1949, Serial No. 106,734

6 Claims. (Cl. 260—570.6)

This invention relates to the purification of epinephrine. More particularly the invention relates to a process for the removal of contaminants found in natural epinephrine.

Natural epinephrine, as obtained from adrenal glands, contains a considerable amount of a primary amine compound known as arterenol. Because the latter compound possesses pharmacological properties different from those of epinephrine, it is desirable that a separation of arterenol from epinephrine should be made.

Of the methods known to the art which are used in the isolation and purification of epinephrine from adrenal glands, none is able to afford the separation of the primary amine arterenol from the secondary amine epinephrine. The methods ordinarily used for the separation of primary from secondary amines are based on a difference in alkali-solubility of certain derivatives of these amines. Because arterenol and epinephrine both contain acidic phenol groups, such methods cannot be employed in this case.

In accordance with the invention an acid addition salt of arterenol present in admixture with an acid addition salt of natural epinephrine is reacted in an aqueous medium with a carbonyl compound of the type hereinafter defined. The reaction mixture is made slightly alkaline and the purified water-insoluble free base of epinephrine is separated from the solution containing the water-soluble arterenol reaction product. In carrying out the reaction temperatures varying from about 24 to 90° C. may be used, the preferred temperature being between about 75 to 85° C. The time required for completion of the reaction varies, of course, with the temperature. For example, about one-half to one hour suffices at a temperature of 75 to 85° C. while several hours are required at a temperature of about 50° C. In order to insure homogeneity of the reaction mixture a water-miscible lower aliphatic alcohol, such as methanol, ethanol or isopropanol, is preferably used in the reaction medium. Up to about 70% can be used, if desired, although in general a much lower percentage is satisfactory.

The acid addition salts of the amine mixture used in the process are preferably those derived from weak acids such as the lower fatty acids. The salts derived from the mineral acids, such as hydrochloric, hydrobromic and sulfuric acid, may also be used although slightly lower yields of the purified epinephrine usually result.

Among the various carbonyl compounds which are suitable are lower aliphatic esters of ethoxymethylene malonic acid, ethoxymethylene aceto- acetic acid, ethoxymethylene cyanoacetic acid, oxalacetic acid and the diketone, acetonylacetone. The amount of carbonyl compound used in the process is in excess of that required to react with all of the primary amine compound present in the mixture of primary and secondary amine as existent in the impure natural epinephrine. The amount in excess ranges from about 20 to 60%, and preferably is about 45 to 50%.

After completion of the reaction between the active carbonyl compound and the arterenol component, the reaction mixture is made slightly alkaline to liberate the insoluble free base of epinephrine. As the pH of the alkalinized mixture should not be greater than about 9.5, it is preferable to use a weak base. This lessens the possibility of destruction and/or solubilization of the epinephrine which is soluble and somewhat unstable in strong alkali. Some of the many alkaline reagents which can be used in the neutralization step are ammonium hydroxide, alkali metal carbonates, bicarbonates and hydroxides and the like.

Of the various carbonyl compounds used in the practice of the invention, the ethyl ester of ethoxymethylene malonic ester is the most efficacious in bringing about the purification of natural epinephrine. With this carbonyl compound, epinephrine containing less than 0.1% of arterenol is obtainable after one cycle of the process is carried out. With the other carbonyl compounds, two or more cycles of the same process are used to effect purification of the epinephrine to the same degree.

The following examples are illustrative:

*Example 1*

454.5 parts by weight of crude natural epinephrine, containing about 20% by weight of the primary amine compound arterenol, are mixed with 220 parts of glacial acetic acid in 2000 parts of distilled water. After stirring to solution, 175 parts of ethyl ethoxymethylene malonic ester in 2200 parts of ethanol are added to the solution. The total solution is heated to 75–85° C. and refluxed for one hour. After cooling to room temperature the solution is diluted with 4000 parts of distilled water and the pH is adjusted to 9 by the addition of ammonium hydroxide. Upon standing for one-half hour a precipitate settles and is filtered. The filter cake is washed with water and then slurried with absolute ethanol at 30–35° C. The slurry is filtered and the cake is washed with acetone and dried. This solid now consists of practically pure epinephrine containing less than 0.1% of primary amine compound.

When such material possesses a tan coloration, it may be decolorized by the following procedure. The solid is redissolved in 2000 parts of 10% acetic acid. 5 parts of sodium bisulfite are added and 75 parts of activated carbon are stirred into the solution. The mixture is stirred for one-half hour, filtered and then treated with 50 more parts of activated carbon. The mixture is then filtered using a powdered inert filter aid. The filtrate is chilled and treated with ammonium hydroxide as before. The resulting precipitate is washed thoroughly with water, ethanol and acetone, and is dried in vacuo to yield an almost white solid consisting of practically pure epinephrine, M. P. 206–9° C.

*Example 2*

454.5 parts by weight of crude natural epinephrine, containing about 20% by weight of the primary amine compound arterenol, are mixed with 220 parts of glacial acetic acid in 2000 parts of distilled water. After stirring to solution, 175 parts of ethyl ethoxymethylene malonic ester in 220 parts of ethanol are added to the solution. The total solution is heated at 50° C. for two hours. After cooling to room temperature the solution is diluted with 4000 parts of distilled water and the pH is adjusted to pH 9 by the careful addition of dilute sodium hydroxide. Upon standing for one-half hour a precipitate settles and is filtered. The filter cake is washed with water and then slurried with absolute ethanol at 30–35° C. The slurry is filtered and the cake is washed with acetone and dried. This solid now consists of epinephrine containing less than 2% of primary amine compound. This product can be subjected to the same process again to yield a product as pure as that obtained in Example 1.

*Example 3*

454.5 parts by weight of crude natural epinephrine, containing about 20% by weight of the primary amine compound arterenol, are mixed with 220 parts of glacial acetic acid in 2000 parts of distilled water. After stirring to solution, 175 parts of ethyl ethoxymethylene malonic ester in 220 parts of ethanol are added to the solution. The total solution is allowed to stand for three days at 25° C. and is then diluted with 4000 parts of distilled water and the pH is adjusted to 9 by the addition of ammonium hydroxide. Upon standing for one-half hour a precipitate settles and is filtered. The filter cake is washed with water and then slurried with absolute ethanol at 30–35° C. The slurry is filtered and the cake is washed with acetone and dried. This solid now consists of epinephrine containing less than 5% primary amine compound. This product can be subjected to the same process again to yield a product as pure as that obtained in Example 1.

*Example 4*

454.5 parts by weight of crude natural epinephrine, containing about 20% by weight of the primary amine compound arterenol, are mixed with 220 parts of glacial acetic acid in 2000 parts of distilled water. After stirring to solution, 175 parts of ethyl ethoxymethylene malonic ester in 2200 parts of isopropanol are added to the solution. The total solution is heated to 80–90° C. and refluxed for one hour. After cooling to room temperature the solution is diluted with 4000 parts of distilled water and the pH is adjusted to 9 by the addition of ammonium hydroxide. Upon standing for one-half hour a precipitate settles and is filtered. The filter cake is washed with water and then slurried with absolute ethanol at 30–35° C. The slurry is filtered and the cake is washed with acetone and dried. This solid now consists of practically pure epinephrine containing less than 0.1% of primary amine compound.

*Example 5*

454.5 parts by weight of crude natural epinephrine, containing about 20% by weight of the primary amine compound arterenol, are mixed with 225 parts of concentrated hydrochloric acid in 2000 parts of distilled water. After stirring to solution, 175 parts of ethyl ethoxymethylene malonic ester in 2200 parts of ethanol are added to the solution. The total solution is heated to 75–85° C. and refluxed for one hour. After cooling to room temperature the solution is diluted with 4000 parts of distilled water and the pH is adjusted to 9 by the addition of ammonium hydroxide. Upon standing for one-half hour a precipitate settles and is filtered. The filter cake is washed with water and then slurried with absolute ethanol at 30–35° C. The slurry is filtered and the cake is washed with acetone and dried. This solid now consists of epinephrine containing less than 6% of primary amine compound. This product can be subjected to the same process again to yield a product as pure as that obtained in Example 1.

*Example 6*

454.5 parts by weight of crude natural epinephrine, containing about 20% by weight of the primary amine compound arterenol, are mixed with 220 parts of glacial acetic acid in 2000 parts of distilled water. After stirring to solution, 126 parts of ethyl ethoxymethylene acetoacetate in 2200 parts of ethanol are added to the solution. The total solution is heated to 75–85° C. and refluxed for one hour. After cooling to room temperature the solution is diluted with 4000 parts of distilled water and the pH is adjusted to 9 by the addition of ammonium hydroxide. Upon standing for one-half hour a precipitate settles and is filtered. The filter cake is washed with water and then slurried with absolute ethanol at 30–35° C. The slurry is filtered and the cake is washed with water and then slurried with absolute ethanol at 30–35° C. The slurry is filtered and the cake is washed with acetone and dried. This solid now consists of epinephrine containing less than 10% of primary amine compound. This product can be subjected to the some process several times to obtain a product as pure as that obtained in Example 1.

*Example 7*

454.5 parts by weight of crude natural epinephrine, containing about 20% by weight of the primary amine compound arterenol, are mixed with 220 parts of glacial acetic acid in 2000 parts of distilled water. After stirring to solution, 137 parts of ethyl ethoxymethylene cyanoacetate in 2200 parts of ethanol are added to the solution. The total solution is heated to 75–85° C. and refluxed for one hour. After cooling to room temperature the solution is diluted with 4000 parts of distilled water and the pH is adjusted to 9 by the addition of ammonium hydroxide. Upon standing for one-half hour a precipitate settles and is filtered. The filter cake is washed with water and then slurried with absolute ethanol at 30–35° C. The slurry is filtered and the cake is washed with acetone and dried. This solid now consists of epinephrine containing less than 10% of primary amine compound. This product can be subjected to the same process several times to obtain a product as pure as that obtained in Example 1.

*Example 8*

454.5 parts by weight of crude natural epinephrine, containing about 20% by weight of the primary amine compound arterenol, are mixed with 220 parts of glacial acetic acid in 2000 parts of distilled water. After stirring to solution, 152 parts of ethyl oxalacetate in 2200 parts of ethanol are added to the solution. The total solution is heated to 75–85° C. and refluxed for one hour. After cooling to room temperature the solution is diluted with 4000 parts of distilled water and the pH is adjusted to 9 by the addition of ammonium hydroxide. Upon standing for one-half hour a precipitate settles and is filtered. The filter cake is washed with water and then slurried with absolute ethanol at 30–35° C. The slurry is filtered and the cake is washed with acetone and dried. This solid now consists of epinephrine containing less than 10% of primary amine compound. This product can be subjected to the same process several times to obtain a product as pure as that obtained in Example 1.

*Example 9*

454.5 parts by weight of crude natural epinephrine, containing about 20% by weight of the primary amine compound arterenol, are mixed with 220 parts of glacial acetic acid in 2000 parts of distilled water. After stirring to solution, 123 parts of acetonylacetone are added to the solution. The total solution is heated to 75–85° C. and refluxed for one hour. After cooling to room temperature the pH is adjusted to 9 by the addition of ammonium hydroxide. Upon standing for one-half hour a precipitate settles and is filtered. The filter cake is washed with water and then slurried with absolute ethanol at 30–35° C. The slurry is filtered and the cake is washed with acetone and dried. This solid now consists of epinephrine containing less than 10% of primary amine compound. This product can be subjected to the same process several times to obtain a product as pure as that obtained in Example 1.

What I claim is:

1. Process for the purification of natural epinephrine which comprises reacting an arterenol acid addition salt of the class consisting of mineral acid and lower fatty acid salts present in admixture with the same acid addition salt of natural epinephrine in aqueous medium at 25–90° C. with an excess of a carbonyl compound of the class consisting of acetonylacetone, lower alkyl esters of ethoxymethylene malonic acid, lower alkyl esters of ethoxymethylene acetoacetic acid, lower alkyl esters of ethoxymethylene cyanoacetic acid, and lower alkyl esters of oxalacetic acid, alkalinizing the reaction mixture to a pH not greater than about 9.5 and separating the insoluble, purified free base of natural epinephrine from the solution.

2. Process for obtaining epinephrine substantially free from arterenol which comprises adding a mixture containing epinephrine and arterenol to an aqueous solution containing an acid of the class consisting of mineral acids and lower fatty acids forming a solution of both epinephrine and arterenol, adding thereto a carbonyl compound in a water-miscible organic solvent, said carbonyl compound being of the class consisting of acetonylacetone, lower alkyl esters of ethoxymethylene malonic acid, lower alkyl esters of ethoxymethylene acetoacetic acid, lower alkyl esters of ethoxymethylene cyanoacetic acid, and lower alkyl esters of oxalacetic acid, heating to a temperature from 25–90° C., alkalinizing the reaction mixture to a pH not greater than about 9.5 thereby precipitating epinephrine substantially free from arterenol, and separating the precipitated epinephrine from the solution containing the arterenol.

3. Process for obtaining epinephrine substantially free from arterenol which comprises adding a mixture containing epinephrine and arterenol to aqueous acetic acid forming a solution of both epinephrine and arterenol, adding thereto ethyl ethoxymethylene malonic ester in ethanol, heating to a temperature from 25–90° C., alkalinizing the reaction mixture to a pH not greater than about 9.5 thereby precipitating epinephrine substantially free from arterenol, and separating the precipitated epinephrine from the solution containing the arterenol.

4. Process for the purification of natural epinephrine which comprises reacting a lower fatty acid addition salt of arterenol present in admixture with the same acid addition salt of natural epinephrine in aqueous medium at 25–90° C. with an excess of a lower alkyl ester of ethoxymethylene malonic acid, alkalinizing the reaction mixture to a pH not greater than about 9.5 and separating the insoluble, purified free base of natural epinephrine from the solution.

5. Process for the purification of natural epinephrine which comprises reacting a lower fatty acid addition salt of arterenol present in admixture with the same acid addition salt of natural epinephrine in aqueous medium at 25–90° C. with an excess of a lower alkyl ester of ethoxymethylene cyanoacetic acid, alkalinizing the reaction mixture to a pH not greater than about 9.5 and separating the insoluble, purified free base of natural epinephrine from the solution.

6. Process for the purification of natural epinephrine which comprises reacting a lower fatty acid addition salt of arterenol present in admixture with the same acid addition salt of natural epinephrine in aqueous medium at 25–90° C. with an excess of a lower alkyl ester of ethoxymethylene acetoacetic acid, alkalinizing the reaction mixture to a pH not greater than about 9.5 and separating the insoluble, purified free base of natural epinephrine from the solution.

FRANK H. TENDICK.

No references cited.